United States Patent
Fukushima

[11] Patent Number: 6,128,569
[45] Date of Patent: Oct. 3, 2000

[54] METHOD AND APPARATUS FOR ESTIMATING SIDESLIP ANGLE OF AUTOMOTIVE VEHICLE

[75] Inventor: Naoto Fukushima, Kanagawa, Japan

[73] Assignee: Unisia Jecs Corporation, Atsugi, Japan

[21] Appl. No.: 09/042,454

[22] Filed: Mar. 16, 1998

[30] Foreign Application Priority Data

Mar. 21, 1997 [JP] Japan ................................ 9-068500

[51] Int. Cl.$^7$ ........................................................ B60T 8/24
[52] U.S. Cl. .............................. 701/90; 340/348; 701/72
[58] Field of Search ................................ 701/36, 69, 70, 701/71, 72, 82, 90, 91; 73/11.04, 11.07; 340/438, 440

[56] References Cited

U.S. PATENT DOCUMENTS

| | | | |
|---|---|---|---|
| 4,706,771 | 11/1987 | Kawabe et al. ........................ | 180/142 |
| 4,870,864 | 10/1989 | Io ............................................. | 73/517 |
| 5,344,224 | 9/1994 | Yasuno .................................... | 303/107 |
| 5,422,568 | 6/1995 | Hashizume et al. .................... | 324/166 |
| 5,480,219 | 1/1996 | Kost et al. ............................... | 303/146 |
| 5,549,093 | 8/1996 | Imamura ................................. | 123/481 |
| 5,616,864 | 4/1997 | Johnson et al. ....................... | 73/504.04 |
| 5,925,083 | 7/1999 | Ackermann .............................. | 701/41 |

OTHER PUBLICATIONS

Japanese document vol. No. 964, for an academic lecture meeting of Society of Automotive Engineers published on Oct. 1996.

*Primary Examiner*—Eric S. McCall
*Attorney, Agent, or Firm*—Foley & Lardner

[57] ABSTRACT

In method and apparatus for estimating a sideslip angle of an automotive vehicle, a cornering power ($PC_2$) of a rear road wheel is calculated as in the following equation (1$a$) using detected values of a yaw rate ($\Delta\psi$), a lateral acceleration ($\Delta\Delta Y$), and a vehicle velocity (V). The estimated sideslip angle ($P\beta$) is calculated in the following equation (1$b$).

$$PC_2=(V/h)(Ma\Delta\Delta Y-I\Delta\psi s)s/[\Delta\psi(bs+V)-\Delta\Delta Y]+f(\Delta\Delta Y) \quad (1a).$$

$$P\beta=-Kbr[(Tbs+1)]\Delta\psi \quad (1b).$$

In the equations of (1$a$) and (1$b$), M denotes a mass of the vehicle, s denotes a Laplace transform operator, a denotes a straight distance from a weight center position up to a front road wheel position in a bicycle model of the vehicle, I denotes a vehicular inertia moment, b denotes a straight distance from the weight center position up to a rear road wheel position in the bicycle model, $f(\Delta\Delta Y)$ is expressed as $f(\Delta\Delta Y)=C^*_2|\Delta\Delta Y|/9.8$ ($C_2^*$ denotes a gradient of a straight line connecting a point at which a side force of the rear road wheel is saturated in a graph representing the side force with respect to the sideslip angle), $Kbr=[1-(Ma/(hbPC_2))V^2](b/V)$, and $Tb=IV/(hbPC_2-MaV^2)$.

9 Claims, 3 Drawing Sheets

1 …

METHOD AND APPARATUS FOR ESTIMATING SIDESLIP ANGLE OF AUTOMOTIVE VEHICLE

The contents of the application No. Heisei 9-68500, with a filing date of Mar. 21, 1997 in Japan, are herein incorporated by reference.

BACKGROUND OF THE INVENTION a) Field of the Invention

The present invention relates to method and apparatus for estimating a sideslip angle of an automotive vehicle.

b) Description of the Related Art

A previously proposed method for estimating a sideslip angle of an automotive vehicle is exemplified by a Japanese document volume No. 964 for an academic lecture meeting of a Society of Automotive Engineers published on Oct. in 1996.

The previously proposed estimating method for the automotive vehicle generally includes two steps of a road surface circumstance determining step; and a sideslip angle estimating step using a vehicular bicycle model.

In the side slip angle estimating step, the side slip angle estimating equation is calculated using a motion equation in the vehicular bicycle model (mathematical model) on the basis of a steering angle, an acceleration, a yaw rate, and a vehicle speed.

At this time, a cornering power Cf on two front road wheel's tires and a cornering power Cr on two rear road wheel's tires are corrected after the determination of a road surface circumstance (for example, a (dry road surface, a wet road surface, a snow road surface, or an icy road surface) since these cornering powers are largely varied according to the road surface circumstance.

That is to say, the estimated value ($\beta^\wedge$) of the side slip angle ($\beta$) in the previously proposed sideslip angle is calculated as follows:

$$\beta^\wedge = \{MV(d\beta/dt + d\theta/dt) + (C_fL_f - C_rL_r)d\theta/dt/V - C_f\delta f - C_f\beta f - C_r\beta r + F + R\}/C_f + C_r).$$

In details, in the road surface circumstance determining step, an estimated value of the yaw rate and the detected value of the yaw rate are stored in time series data. The estimated value of the yaw rate is calculated as follows:

$$d\theta^\wedge/dt = 1/(1 + AV^2) \times (V/L) \times \delta f,$$

wherein A denotes a stability factor, V denotes the vehicle speed, $\delta f$ denotes the steering angular displacement (steered angle), and $L = L_f + L_r$ and denotes a wheel base.

Then, a trajectory between the estimated value of the yaw rate and the detected value of the yaw rate after a constant period of time from the time at which the time series data are stored is plotted. At this time, a phase deviation of the estimated value of the yaw rate with respect to the detected value of the yaw rate is determined according to the time series data. The plotted trajectory is used to determine the road surface circumstance.

SUMMARY OF THE INVENTION

However, in the previously proposed slip angle estimating method, at the road surface circumstance determining block, the estimated value and the detected value of the yaw rate are stored as the time series data during the past constant period of time and the determination of whether the road surface is dry or wet is made according to the trajectory plotted according to the two time series data.

Hence, it requires a constant time for the previously proposed sideslip angle estimating method to determine the road surface circumstance.

The previously proposed estimating method cannot follow an abrupt change of the road surface circumstance, e.g., from the dry road surface circumstance to the wet road surface circumstance so that an erroneous determination of the road surface circumstance from an actual road surface condition is made and an erroneously estimated value of the side slip angle can be derived. This makes a deterioration of a performance of, e.g., a vehicular stability control system (spin preventing system) using the side slip angle value.

It is an object of the prevent invention to provide method and apparatus for estimating a sideslip angle of an automotive vehicle which can accurately determine an estimated value of the sideslip angle instantaneously coping with an abrupt change in a road surface circumstance on which the vehicle is running.

The above described object can be achieved by providing a method for estimating a sideslip angle for an automotive vehicle, comprising the steps of: a) detecting a yaw rate ($\Delta\psi$) of the vehicle; b) detecting a lateral acceleration ($\Delta\Delta Y$) of the vehicle; c) detecting a vehicle velocity (V) of the vehicle; d) calculating an estimated value ($PC_2$) of a cornering power of a rear road wheel in a bicycle model on the basis of the detected yaw rate ($\Delta\psi$), the lateral acceleration ($\Delta\Delta Y$) of the vehicle, and the vehicle velocity (V) of the vehicle; e) calculating an equation representing a relationship between the lateral acceleration ($\Delta\Delta Y$) of the vehicle and the yaw rate ($\Delta\psi$) thereof, the equation being derived from a first transfer function of the yaw rate ($\Delta\psi$) of the vehicle with respect to the steered angle ($\delta$) derived from the bicycle model of the vehicle and a second transfer function of the sideslip angle ($\beta$) of the vehicle with respect to the steered angle ($\delta$) derived from the bicycle model of the vehicle; and f) calculating an estimated value ($P\beta$) of the sideslip angle of the vehicle from the equation representing the relationship between the lateral acceleration ($\Delta\Delta Y$) and the yaw rate ($\Delta\psi$) calculated at the step e) and from the estimated value ($PC_2$) of the cornering power of the rear road wheel calculated at the step d).

The above-described object can also be achieved by providing an apparatus for estimating a side slip angle for an automotive vehicle, comprising: a first sensor for detecting a yaw rate ($\Delta\psi$) of the vehicle; a second sensor for detecting a lateral acceleration ($\Delta\Delta Y$) of the vehicle; a third sensor for detecting a vehicle velocity (V) of the vehicle; a first calculator for calculating an estimated value ($PC_2$) of a cornering power of one of rear road wheels on the basis of the detected yaw rate ($\Delta\psi$), lateral acceleration ($\Delta\Delta Y$) of the vehicle, the vehicle velocity (V) of the vehicle; a second calculator for calculating an equation representing a relationship between the lateral acceleration ($\Delta\Delta Y$) of the vehicle and the yaw rate ($\Delta\psi$) thereof, the equation being derived from a first transfer function of the yaw rate ($\Delta\psi$) of the vehicle with respect to the steering angle ($\delta$) derived from the bicycle model of the vehicle and a second transfer function of the sideslip angle ($\beta$) of the vehicle with respect to the steering angular displacement ($\delta$); and a third calculator for calculating an estimated value ($P\beta$) of the side slip angle of the vehicle from the equation representing the relationship between the lateral acceleration ($\Delta\Delta Y$) and the yaw rate ($\Delta\psi$) and from the estimated value ($PC_2$) of the cornering power of the corresponding one of the rear road wheels.

BEST MODE FOR CARRYING OUT THE INVENTION

Reference will hereinafter be made to the drawings in order to facilitate a better understanding of the present invention.

Figure 1:
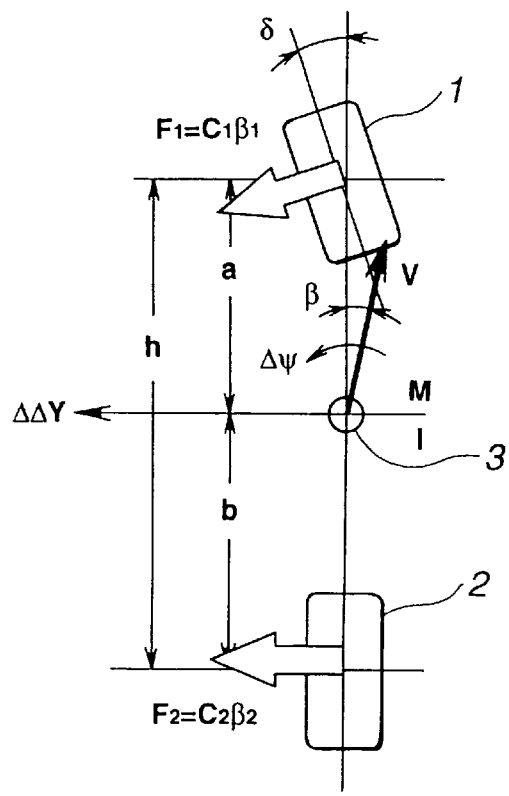
FIG. 1 is a dynamic bicycle model of a vehicle used to estimate a sideslip angle of the vehicle in a sideslip angle estimating apparatus in a preferred embodiment according to the present invention.

FIG. 1 shows a mathematical bicycle model of an automotive vehicle used to estimate a sideslip angle of the vehicle in a sideslip angle estimating apparatus according to the present invention.

In FIG. 1, 1 denotes one of front left and right road wheels (the term of road wheel includes its tire), 2 denotes one of rear left and right road wheels which is the same side as the one of the front road wheels 1, and 3 denotes a weight center position of the vehicle.

It is noted that in the bicycle model the front road wheel 1 is virtually located at a center of the front left and right road wheels intersecting the straight line from the weight center of the vehicle and the rear road wheel 2 is virtually located at a center of the rear left and right road wheels which is the same case of the front road wheel 1.

Furthermore, in FIG. 1, δ denotes a front road wheel steer angle, $\Delta\psi$ denotes a yaw rate, $\Delta\Delta Y$ denotes a lateral acceleration, β denotes a sideslip angle, $C_1$ denotes a front road wheel cornering power (=2Cf (including the front left and right road wheels)), $C_2$ denotes a rear road wheel cornering power (=2Cr (including the rear left and right road wheels)), M (=m in FIG. 1) denotes a mass of the vehicle, I denotes a vehicular inertia moment, h denotes a wheelbase (h=a+b) and V denotes a vehicular (forward) velocity.

It is noted that two basic motion equations of the vehicle in the bicycle model of FIG. 1 are described as follows:

$$MV(d\beta/dt+\Delta\psi)=-Cf(\beta+a/V\cdot\Delta\psi-\delta)-Cr\ (\beta b\Delta\psi/V) \quad (1)$$

$$I\Delta\Delta\psi=-Cfa(\beta+Lf/V\Delta\psi-\delta)+CrLr(\beta-Lr\ \Delta\psi) \quad (2).$$

If a Laplace transform for the respective equations of (1) and (2) is calculated, the following two equations (a) and (b) are derived.

Transfer functions of responses of the yaw rate ($\Delta\psi$) and lateral acceleration ($\Delta\Delta Y$) to the steer angle (δ) in the bicycle model of the vehicle in FIG. 1 are described as follows:

A first transfer function ($\Delta\psi/\delta$) from the steer angle to the yaw rate is given by:

$$(\Delta\psi/\delta)=Kr(Trs+1)\omega o^2/(s^2+2\zeta o\omega o s+\omega o^2) \quad (a).$$

A second transfer function ($\Delta\Delta Y/\delta$) from the steered angle (δ) to the lateral acceleration ($\Delta\Delta Y$) is given by:

$$(\Delta\Delta Y/\delta)=Kg(Tg2s^2+Tg1s+1)\omega o^2/(s^2+2\zeta o\omega o s+\omega o^2) \quad (b).$$

In the equations of (a) and (b), ζo denotes a vehicular damping ratio and ωo denotes a vehicular natural frequency.

From the equations (a) and (b), a third transfer function ($\Delta\psi/\Delta\Delta Y$) is established as follows:

$$(\Delta\psi/\Delta\Delta Y)=(Kr/kg)(Trs+1)/(Tg2s^2+Tg1s1+) \quad (c).$$

In the equations (a) through (c), $$Kr=[1/(1+KsV^2)](V/h) \quad (d),$$

$$Kg=[1/(1+KsV^2)](V^2/h) \quad (e);$$

$$Tr=(Ma/hC_2))V \quad (f);$$

$$Tg2=I/(hC_2) \quad (g);$$

and $$Tg1=b/V \quad (h).$$

Substituting these equations (e) through (h) into the equation (c), the following equation can be derived.

$$\Delta\psi/\Delta\Delta Y=(1/V)[(Ma/h)(V/C_2)s+1]/[(I/hC_2)s^2+(b/V)s+1] \quad (j).$$

The equation (j) represents a ratio between the first transfer function in the equation (a) and the second transfer function in the equation (b) in order to eliminate a tire characteristic of the front road wheels. That is to say, since the front road wheels serve to steer the vehicle, the front road wheel tire characteristics are not used to estimate the sideslip angle β.

The rear road wheel cornering power $C_2$ can be obtained from the equation (j).

That is to say, $$C_2=(V/h)(Ma\Delta\Delta Y-I\Delta\psi s)s/[\Delta\psi(bs+V)-\Delta\Delta Y] \quad (k).$$

Figure 2:
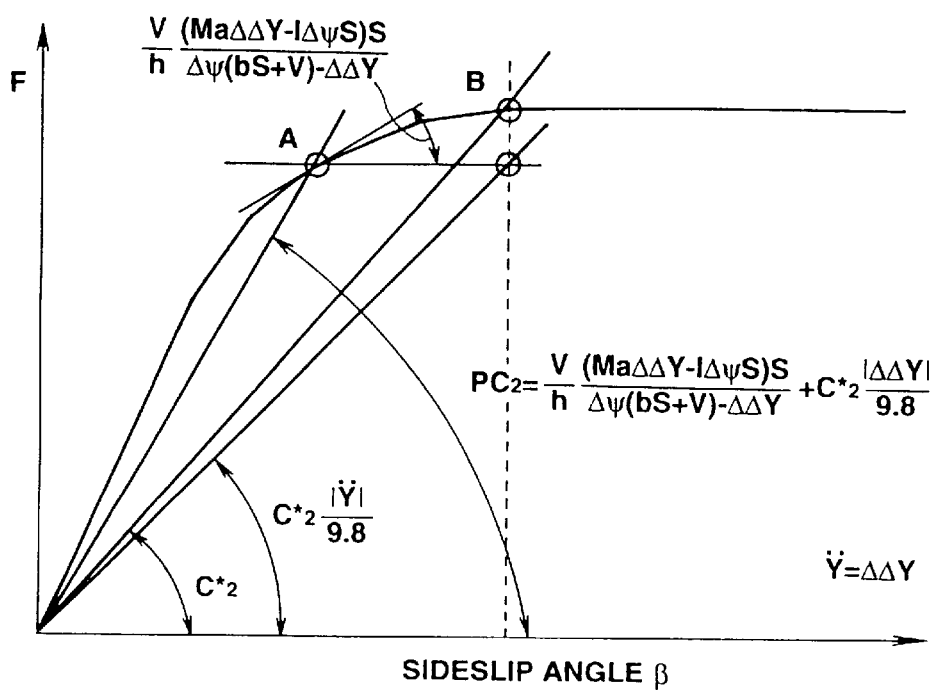
FIG. 2 is a characteristic graph representing a relationship between a side force F (longitudinal axis) of a rear road wheel and the sideslip angle β (lateral axis).

FIG. 2 shows a side force characteristic F of a rear tire with respect to the sideslip angle. As shown in FIG. 2, the side force characteristic indicates non-linear.

Hence, $C_2$ derived from the equation (k) represents a gradient of a polygonal line at an operating point changing continuously from time to time. A value of $C_2$ required to estimate the sideslip angle β is the gradient of a straight line connecting the operating point A in FIG. 2 to an origin of FIG. 2.

It is therefore necessary to correct the estimated value $PC_2$ of the rear road wheel cornering power as follows:

$$PC_2=(V/h)(Ma\Delta\Delta Y-I\Delta\psi s)s/[\Delta\psi(bs+V)-\Delta\Delta Y+C_2{}^*|\Delta\Delta Y|/9.8 \quad (m).$$

In the equation (m), $C_2{}^*$ denotes a gradient of a straight line connecting a point B at which the side force F is saturated to the origin of FIG. 2 (a side force F is zero and the slid slip angle β is zero).

The equation (m) indicates that ai first term of a right side of the equation (m) is dominant when the lateral acceleration $\Delta\Delta Y$ is so small that the side force F approaches to zero and that the first term of the right side of the equation (m) is dominant when the lateral acceleration is so large that the side force F is saturated at the point B.

The transfer function of the response of the sideslip angle $\beta$ to the steered angle $\delta$ in the bicycle model of FIG. 1 can be described as follows:

$$(\beta/\delta)=Kb(Tbs+1)\omega^2/(s^2+2\zeta\omega 0s+\omega 0^2) \qquad (n).$$

In the equation (n), $$Kb=\{[1-(Ma/(hbC_2)V^2]/(1+KsV^2)\}(b/h) \qquad (p)$$

and $$Tb=IV/(hbC_2-MaV^2) \qquad (q).$$

From the equation (a) and (n), the following equation (r) is established:

$$(\beta/\Delta\psi)=-Kbr(Tbs+1)/Trs+1) \qquad (r).$$

In the equation (r), $$Kbr32\ [1(Ma/(hbC_2)V^2)(b/v) \qquad (s).$$

Hence, the estimated value $P\beta$ of the sideslip angle $\beta$ is derived from the equation (r) as follows:

$$P\beta=-Kbr[(Tbs+1)/(Trs+1)]\Delta\psi \qquad (t).$$

Figure 4:
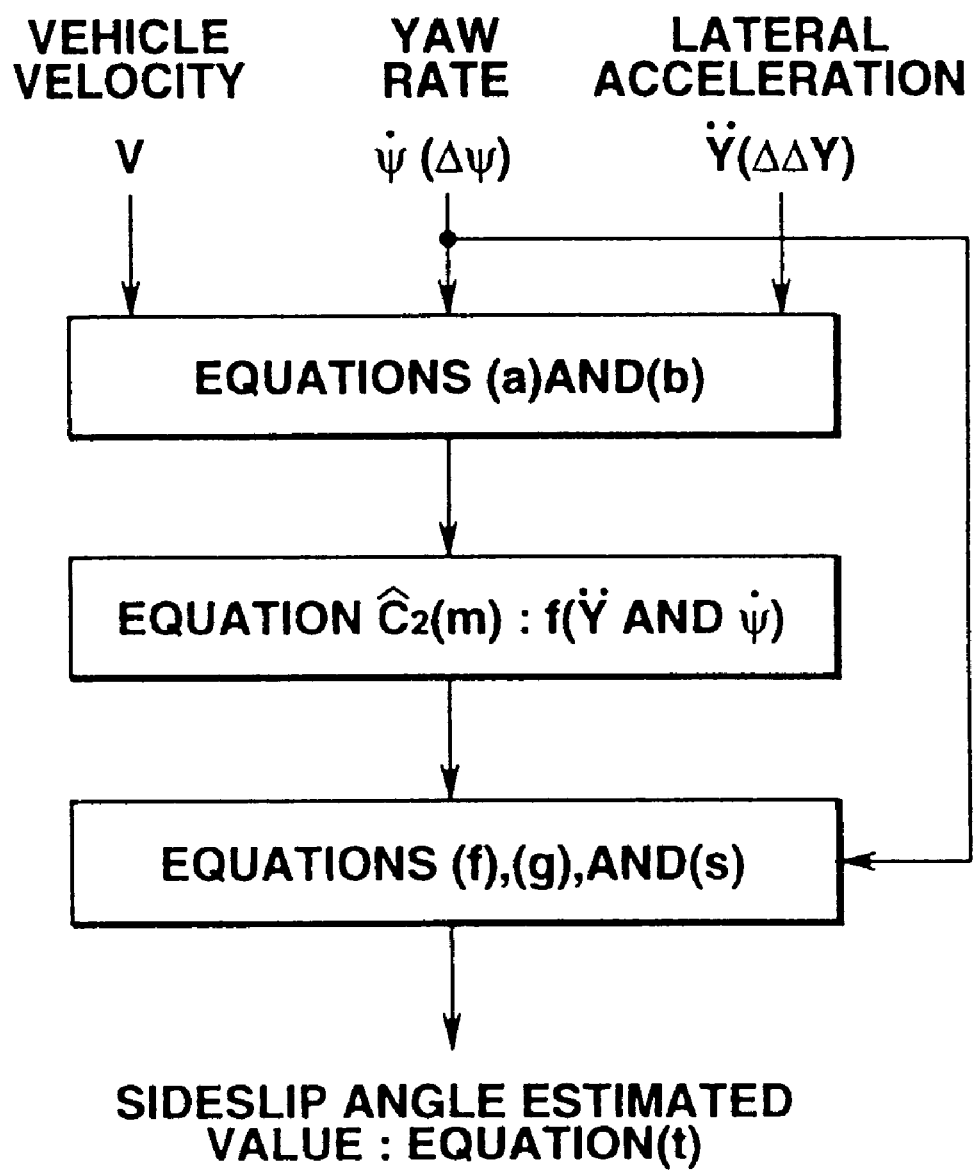
FIG. 4 is an explanatory view for explaining a derivation of an estimated value of the sideslip angle of the vehicle in the case of the present invention.

As shown in FIG. 4, the estimated value $P\beta$ of the sideslip angle is derived.

In the procedure of estimating the sideslip angle as $P\beta$, the rear road wheel cornering power $PC_2$ is calculated from the equation (m) using the detected values of the yaw rate $\Delta\psi$, the lateral acceleration $\Delta\Delta Y$ and the vehicle velocity V. Next, the calculations of equations (f), (g), and (s) are carried out using the estimated value ($PC_2$) of the rear road wheel cornering power. That is to say, the equation (f) is replaced with $Tr=(Ma/(hPC_2))V$, the equation (g) is replaced with $Tg2=I/(hPC_2)$, and the equation (s) is replaced with $Kbr-[1-(Ma/(hbPC_2)V^2)](b/V)$. Finally, the equation (t) is used to calculate the estimated value P $\beta$ of the sideslip angle from the detected value of the yaw rate $\Delta\psi$.

The sideslip angle may be estimated from the following equation (u) which is established from the equation (b) and (n).

$$P\beta=-Kbg[(Tbs+1)/(Tg2s^2+Tg1s+1)]\Delta\Delta Y \qquad (u).$$

In the equation (u), $$Kbg=[1-(Ma/(hbPC_2))V^2](b/V^2) \qquad (v).$$

It is noted that Tb, Tg2, Tg1 denote values calculated by replacing C2 in the equations (g), (g), and (h) with $PC_2$. That is to say, $Tb=IV/(hbPC_2-MaV^2)$, $Tg2=I/(hPC_2)$, and $Tg1=b/V$.

Figure 3:
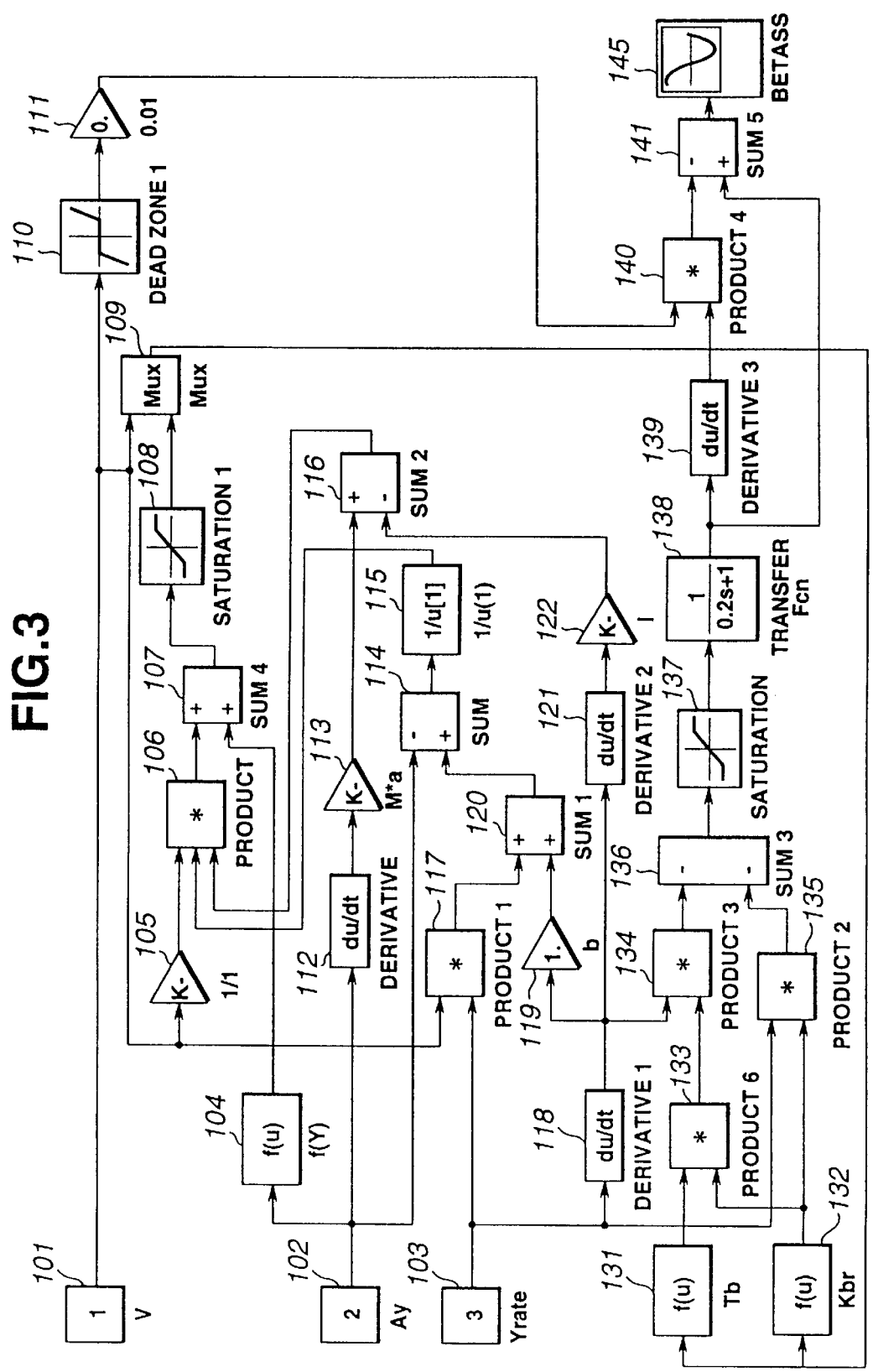
FIG. 3 is a calculation circuit block diagram of the sideslip angle estimating apparatus in the preferred embodiment according to the present invention.

FIG. 3 shows an internal circuit block diagram of a sideslip angle estimating apparatus in a preferred embodiment according to the present invention.

In FIG. 3, the detected value of the vehicle velocity V is inputted into a first input position 101, the detected value of the lateral acceleration $\Delta\Delta Y$ is inputted into a second input position 102, and the detected value of the yaw rate $\Delta\psi$ is inputted into a third input position 103. A circuit 104 calculates the second term of the right side of the equation (m). A circuit 105 multiplies the vehicle velocity V by a gain of $-1/h$ to derive $-V/h$. A circuit 106 serves to calculate a product between a plurality of parameters to drive a calculation result of the first term of the right side of the equation (m). A circuit 104 then calculates the second term f(u) of the right side of the equation (m). A circuit 107 makes a sum of the output of the circuit 106 and that of the circuit 104 to derive the equation of (m). A circuit 108 serves as limiters for setting the upper and lower limits for the output of the circuit 107, an output limited value of the circuit 108 being supplied to circuits 131 and 132 via a multiplexor 109. A circuit 110 serves to set a dead zone. In the embodiment, the dead zone is such that vehicle velocity is below a predetermined low value with the lateral acceleration below 20 m/s$^2$.

In a circuit 111, the output value of the circuit 110 is multiplied by a gain of 0.01. A circuit 112 serves to differentiate du/dt of the lateral acceleration and a circuit 113 serves to multiply du/dt by a gain Ma. A result of the calculations at the circuit 113 is added to an output of a circuit 122 at a circuit 116. A circuit 114 serves to calculate a difference between an output of a circuit 120 and the detected lateral acceleration $\Delta\Delta Y$. A circuit 115 calculates a reverse of the output of the circuit 114. A circuit 117 serves to multiply the vehicle velocity V and the yaw rate $\Delta\psi$. A circuit118 serves to differentiate the yaw rate $\Delta\psi$ and a circuit 119 serves to multiply an output of the circuit 118 by a value of gain b. A circuit 120 serves to add the output of the circuit 117 to the output of the circuit 119. A circuit 121 differentiates an output of the circuit 118 and a circuit 122 multiplies the output of the circuit 121 by a value of gain I. A circuit 131 calculates the equation (q) to derive Tb. A circuit 132 calculates the equation of (s) to derive Kbr. Each output of the circuits 131 and 132 is multiplied by a circuit 133. The result of calculation at the circuit 133 is multiplied by the output value of the circuit 118 ait a circuit 134.

In addition, a circuit 135 multiplies the result of calculation at the circuit 132 by the detected value of the yaw rate $\Delta\psi$.

A circuit 136 multiplies the results of the calculations at the circuits 134 and 135 by—to add them. Upper and lower limit values are set at a circuit 137 for the output result of calculation of the circuit 136. A circuit 138 provides a low pass filter of (1/(0.2s+1) and a circuit 139 serves to differentiate an output of the circuit 138. It is noted that the circuit 138 derives 1/(Trs+1) of the equation (r).

A circuit 140 multiplies the result of the calculation at the circuit 139 with the result of the calculation at the circuit 111. A circuit 141 makes a difference between the output of the circuit 140 and the calculation result of the circuit 138. Then, a circuit 145 provides the estimated value of the sideslip angle P$\Delta$.

In the embodiment, since the estimated value of the cornering power $PC_2$ is a function of only the yaw rate $\Delta\psi$ and the lateral acceleration $\Delta\Delta Y$ and the estimated value $P\beta$ of the sideslip angle $\beta$ is derived from the value of the cornering power, there is no need to store the data in the time series form and the estimated value of the sideslip angle can correspond to the abrupt change in the road surface circumstance. Consequently, high responsive characteristic and high accuracy of the estimated value of the sideslip angle $\beta$ can be achieved. In addition, a performance deterioration of the system which controls the vehicular attitude (a vehicle stability control system) or which forcefully steer the rear road wheels (so-called, a four-wheel steering system (4WS) using the estimated value of the sideslip angle can be prevented. It is of course that a burden on a memory capacity can be relieved and a cost of manufacturing such a control system as described above can be reduced.

It is noted that the yaw rate sensor used to detect the vehicular yaw rate $\Delta\psi$ is exemplified by a U.S. Pat. No. 5,616,864, the lateral acceleration used to detect the vehicular lateral acceleration is exemplified by a U.S. Pat. No. 4,870,864, and the vehicle speed sensor used to detect the vehicle speed is exemplified by a U.S. Pat. No. 5,422,568, the disclosures of which are herein incorporated by reference. It is noted that the estimated value (Pβ) of the sideslip angle is used to a braking system for braking the vehicle so as to make a desired motion of the vehicle which is exemplified by a U.S. Pat. No. 5,344,224, the disclosure of which is herein incorporated by reference or used to an acceleration slip preventing system which is exemplified by a U.S. Pat. No. 5,549,093, the disclosure of which is herein incorporated by reference.

What is claimed is:

1. A method for estimating a sideslip angle for an automotive vehicle, comprising the steps of:
   a) detecting a yaw rate ($\Delta\psi$) of the vehicle;
   b) detecting a lateral acceleration ($\Delta\Delta Y$) of the vehicle;
   c) detecting a vehicle velocity (V) of the vehicle;
   d) calculating an estimated value ($PC_2$) of a cornering power of a rear road wheel in a bicycle model on the basis of the detected yaw rate ($\Delta\psi$), lateral acceleration ($\Delta\Delta Y$) of the vehicle, and the vehicle velocity (V) of the vehicle;
   e) calculating an equation representing a relationship between the lateral acceleration ($\Delta\Delta Y$) of the vehicle and the yaw rate ($\Delta\psi$) thereof, the equation being derived from a first transfer function of the yaw rate ($\Delta\psi$) of the vehicle with respect to a steered angle ($\delta$) derived from the bicycle model of the vehicle and a second transfer function of the side slip angle ($\beta$) of the vehicle with respect to the steered angle ($\delta$) derived from the bicycle model of the vehicle; and
   f) calculating an estimated value (Pβ) of the sideslip angle of the vehicle from the equation representing the relationship between the lateral acceleration ($\Delta\Delta Y$) and the yaw rate ($\Delta\psi$) calculated at the step e) and from the estimated value ($PC_2$) of the cornering power of the rear road wheel calculated at the step d).

2. A method for estimating a side slip angle for an automotive vehicle as claimed in claim 1, wherein the estimated value ($PC_2$) of the cornering power of the rear road wheel is calculated as follows:

$$PC_2=(V/h)(Ma\Delta\Delta Y-I\Delta\psi s)s[\Delta\psi(bs+V)-\Delta\Delta Y]+f(\Delta\Delta Y),$$

wherein s denotes a Laplace transform operator, h denotes a wheel base, a denotes a straight distance from a vehicular weight center position up to a position at which the front road wheel is positioned in a longitudinal direction of the vehicle, b denotes a distance from the vehicular weight center position up to a position at which the rear road wheel is positioned, I denotes a vehicular inertia moment, a first term of a right side of the equation is the cornering power of the rear road wheel derived analytically by the vehicular bicycle model, and $f(\Delta\Delta Y)$ is a correction term according to the lateral acceleration.

3. A method for estimating a sideslip angle for an automotive vehicle as claimed in claim 2, wherein the estimated value (Pβ) of the sideslip angle (β) is calculated as follows:

$$P\beta=-Kbr[(Tbs+1)/(Trs+1)]\Delta\psi,$$

wherein $Kbr=(1-(Ma/(hbPC_2))V^2)(b/V)$ which is derived from $Kbr=(1-(Ma/(hPC_2))V^2)(b/C)$ by replacing $C_2$ with $PC_2$ and $Tr=(Ma/(hPC_2))V$ which is derived from $Tr=(Ma/(hC_2))V$ by replacing $C_2$ with $PC_2$.

4. A method for estimating a sideslip angle for an automotive vehicle as claimed in claim 3, wherein the correction term $f(\Delta\Delta)$ of the equation of the estimated value ($PC_2$) is expressed as a first order equation of $|\Delta\Delta Y|$, $f(\Delta\Delta Y)=C^*_2|\Delta\Delta Y|/9.8$, wherein $C_2^*$ denotes a gradient of a straight line connecting a point at which a side force (F) of the rear road wheel is approximately saturated on a figure representing the side force acted upon the rear road wheel and the sideslip angle β.

5. A method for estimating a sicleslip angle for an automotive vehicle as claimed in claim 4, wherein the estimated value (Pβ) of the sideslip angle is calculated as follows:

$$P\beta=-Kbr[(Tbs+1)/(Trs+1)]\Delta\psi,$$

wherein $Kbr=(1-(Ma/(hbPC_2))V^2)(b/V)$ which is derived from $Kbr=(1-(Ma/(hbC_2))V^2)(b/V)$ by replacing $C_2$ with $PC_2$, $Tb=IV/(hbPC_2-MaV^2)$ which is derived from $Tb=IV/(hbC_2-MaV^2)$ by replacing $C_2$ with $PC_2$, and $Tr=\{Ma/(hPC_2)\}V$ which is derived from $Tr=\{Ma/(hC_2)\}V$ by replacing $C_2$ with $PC_2$.

6. A method for estimating a sideslip angle for an automotive vehicle as claimed in claim 1, wherein the estimated value ($PC_2$) of the cornering power of the rear road wheel when the lateral acceleration $\Delta\Delta Y$ indicates approximately zero is expressed as follows:

$$PC_2=(V/h)(Ma\Delta\Delta Y-I\Delta\psi s)s/\{\Delta\psi(bs+V)-\Delta\Delta Y\},$$

wherein s denotes a Laplace transform operator, M denotes a vehicular weight, a denotes a straight distance from the weight center of the vehicle up to a position of the vehicle at which a corresponding one of the front road wheels is positioned, b denotes a straight distance from the weight center of the vehicle up to an axle of the rear road wheel in a longitudinal direction of the vehicle, h denotes a wheel base, and I denotes a vehicular inertia moment.

7. A method for estimating a side slip angle for an automotive vehicle as claimed in claim 6 wherein the estimated value (Pβ) of the sideslip angle is expressed as follows:

$$P\beta=-Kbr[(Tbs+1)/(Trs+1)]\Delta\psi,$$

wherein $Kbr=(1-(Ma/(hbPC_2))V^2)(b/V)$, $Tb=IV/(hbPC_2-MaV^2)$ and $Tr=[Ma/(hPC_2)]V$.

8. An apparatus for estimating a sideslip angle for an automotive vehicle, comprising:
   a first sensor for detecting a yaw rate ($\Delta\psi$) of the vehicle;
   a second sensor for detecting a lateral acceleration ($\Delta\Delta Y$) of the vehicle;
   a third sensor for detecting a vehicle velocity (V) of the vehicle;
   a first calculator for calculating an estimated value ($PC_2$) of a cornering power of a rear road wheel in a bicycle model on the basis of the detected yaw rate ($\Delta\psi$), lateral acceleration ($\Delta\Delta Y$) of the vehicle, and the vehicle velocity (V) of the vehicle;
   a second calculator for calculating an equation representing a relationship between the lateral acceleration ($\Delta\Delta Y$) of the vehicle and the yaw rate ($\Delta\psi$) thereof, the equation being derived from a first transfer function of the yaw rate ($\Delta\psi$) of the vehicle with respect to a steering angle ($\delta$) derived from the bicycle model of the vehicle and a second transfer function of the sideslip angle ($\beta$) of the vehicle with respect to a steered displacement ($\delta$) and a third calculator for calculating an estimated value (Pβ) of the sideslip angle of the vehicle from the equation representing the relationship between the lateral acceleration (ΔΔY) and the yaw rate (Δψ) and from the estimated value ($PC_2$) of the cornering power of the rear road wheel in the bicycle model.

9. An apparatus for estimating a sideslip angle for an automotive vehicle as claimed in claim 8, wherein the estimated value (Pβ) of the sideslip angle is used for a control system preventing a spin of the vehicle.

* * * * *